United States Patent
Kytzia et al.

(10) Patent No.: US 11,255,480 B2
(45) Date of Patent: Feb. 22, 2022

(54) SUPPORT FRAME FOR A PUMP STAND FOR RECEIVING VACUUM PUMPS, AND MAIN SUPPORT FRAME FOR A COATING DEVICE FOR CONTAINERS, AND COATING DEVICE

(71) Applicant: KHS CORPOPLAST GMBH, Hamburg (DE)

(72) Inventors: Sebastian Kytzia, Todesfelde (DE); Michael Herbort, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 1 day.

(21) Appl. No.: 16/643,794

(22) PCT Filed: Sep. 7, 2018

(86) PCT No.: PCT/EP2018/074077
§ 371 (c)(1),
(2) Date: Mar. 2, 2020

(87) PCT Pub. No.: WO2019/048584
PCT Pub. Date: Mar. 14, 2019

(65) Prior Publication Data
US 2020/0217445 A1    Jul. 9, 2020

(30) Foreign Application Priority Data

Sep. 7, 2017 (DE) .................. 102017120655.8

(51) Int. Cl.
*F16M 1/00* (2006.01)
*F04D 29/60* (2006.01)
*F04D 19/04* (2006.01)

(52) U.S. Cl.
CPC .............. *F16M 1/00* (2013.01); *F04D 29/60* (2013.01); *F04D 19/04* (2013.01); *F16M 2200/08* (2013.01)

(58) Field of Classification Search
CPC ...... F16M 1/00; F16M 2200/08; F04D 29/60; F04D 19/04
See application file for complete search history.

(56) References Cited

U.S. PATENT DOCUMENTS

| 4,048,776 A | * | 9/1977 | Sato | ................... | E04H 12/2261 |
| | | | | | 52/297 |
| 4,216,933 A | * | 8/1980 | Cramer, Jr. | ............... | E04G 1/24 |
| | | | | | 108/56.1 |

(Continued)

FOREIGN PATENT DOCUMENTS

| DE | 102012103295 A1 | 7/2013 |
| DE | 102014000145 A1 | 7/2015 |

(Continued)

OTHER PUBLICATIONS

First Examination Report received for the Indian Patent Application No. 202017008485, dated Dec. 2, 2020, 7 pages.

(Continued)

*Primary Examiner* — Anita M King
(74) *Attorney, Agent, or Firm* — Abelman, Frayne & Schwab

(57) ABSTRACT

A support frame for a pump stand for receiving vacuum pumps for a coating device for coating containers by a coating method. The support frame includes a structure on which bearing struts are formed for detachably connecting to at least two bearing devices, onto which a respective vacuum pump can be detachably mounted. Feet extend downwards from the lowermost bearing struts and have detachable securing devices for connecting to a main support frame of the coating device. The hearing devices have a rectangular cross-section, which is slightly larger than the cross-section of a fork of a lifting truck or a forklift truck, and which are sufficiently spaced apart from one another in the horizontal (Continued)

direction so that the fork of the lifting truck or the stacking fork of the forklift truck can be moved therein with minimal play.

12 Claims, 4 Drawing Sheets

(56) References Cited

U.S. PATENT DOCUMENTS

| | | | |
|---|---|---|---|
| 5,507,237 A * | 4/1996 | Barrow | B65D 19/08 108/53.1 |
| 6,520,318 B1 | 2/2003 | Humele | |
| 7,028,970 B1 * | 4/2006 | Wiseman | F16M 5/00 108/51.11 |
| 9,340,322 B2 * | 5/2016 | Harris | A47B 47/028 |
| 2006/0240680 A1 | 10/2006 | Yokota et al. | |
| 2015/0298094 A1 | 10/2015 | Frye et al. | |
| 2020/0216222 A1 * | 7/2020 | Konrad | B65D 23/02 |

FOREIGN PATENT DOCUMENTS

| | | |
|---|---|---|
| JP | 55139032 U | 10/1980 |
| JP | 62159434 U | 10/1987 |
| JP | 2001335947 A | 12/2001 |
| JP | 2004196352 A | 7/2004 |
| JP | 2012127224 A | 7/2012 |
| JP | 2014211119 A | 11/2014 |
| WO | 2010054206 A2 | 5/2010 |
| WO | 2017129760 A1 | 8/2017 |

OTHER PUBLICATIONS

Office Action received for the Japanese Patent Application No. 2020-513558, dated May 11, 2021, 7 pages (4 pages of English translation & 3 pages of Original document).

German Search Report and Written Opinion for German Application No. DE 10 2017 120655.8, dated Apr. 10, 2018.

* cited by examiner

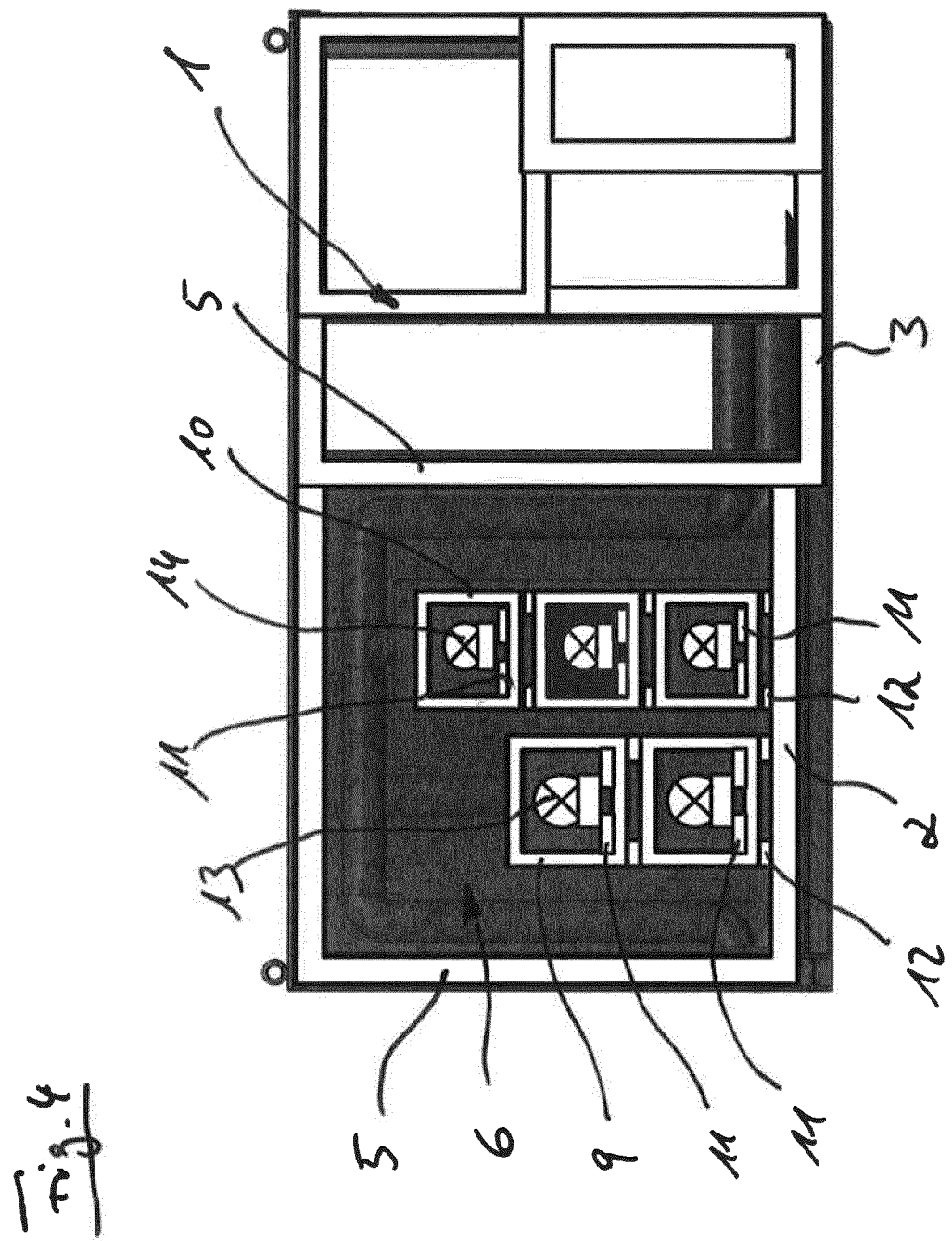

SUPPORT FRAME FOR A PUMP STAND FOR RECEIVING VACUUM PUMPS, AND MAIN SUPPORT FRAME FOR A COATING DEVICE FOR CONTAINERS, AND COATING DEVICE

CROSS-REFERENCE TO RELATED APPLICATIONS

This application claims priority to PCT application no. PCT/EP2018/074077, filed Sep. 7, 2018, which claims priority to German application no. DE 102017120655.8, filed Sep. 7, 2017, the contents of which are incorporated by reference in their entireties.

FIELD OF INVENTION

The present invention relates to a support frame for a pump stand for receiving vacuum pumps for a coating device for containers by means of a coating method, a main support frame for such a coating device, and such a coating device itself.

BACKGROUND OF PRIOR ART

Container coating devices are known from the prior art which are used, among other functions, for the coating of inner surfaces of containers, such as PET bottles. This coating is applied by means of a coating method, for which, among other considerations, a vacuum must be created, in particular by means of a CVD (Chemical Vapor Deposition) method. The vacuum pumps required for the creation of the vacuum can be divided into such as are required for the creation of a pre-vacuum. Such pump arrangements of several vacuum pumps are regularly all set up separately and connected to one another and to a container treatment machine in such a way that the coating process can be carried out in this and the inner sides of the containers are vapour-deposited. Depending on the arrangement of the vacuum pumps, they are difficult to access, or arranged at locations inside the system as a whole which are distant from one another.

SUMMARY OF INVENTION

The object of the present invention is to provide a device which allows for an easy access to the vacuum pumps, and for their rapid replacement.

This object is solved according to the invention is solved by a support frame with the features of claim 1. According to this, provision is made for bearing struts to be formed at a structure for detachably connecting to at least two bearing devices, onto which in each case a respective vacuum pump can be detachably mounted, and which comprises feet, which extend downwards from the lowermost bearing struts, and have detachable securing devices for connecting to a main support frame of the coating device. In this way, the vacuum pumps arranged on the bearing devices can be easily removed from the frame; as well as this, the vacuum pumps are in the immediate proximity and are positioned so as to be easily accessible.

Due to the fact that the bearing devices exhibit a rectangular cross-section, which is slightly larger than the cross-section of the forks of a lifting truck or of a forklift truck, and which are spaced far enough apart from one another in the horizontal direction that the fork of a lifting truck or a stacking fork of a forklift truck can be moved therein with minimal play, the individual vacuum pumps can be very easily removed or put in place respectively by a lifting truck or a forklift truck.

One advantageous further embodiment of the invention makes provision for the support frame to comprise two bearing devices for receiving pre-vacuum pumps or three bearing devices for receiving process-vacuum pumps. As a result, the vacuum pumps which belong together with regard to their function are in direct spatial proximity to one another and can easily be maintained and repaired together.

The object is also solved by a main support frame with the features of claim 3. According to this, provision is made for the main support frame to be equipped with horizontal and vertical carriers, which are arranged relative to one another in a vacuum region such that a first opening is formed in a lateral surface of the main support frame, the height of which is greater than the height of the support frame according to the invention for a pump stand. As a result, the support frame for a pump stand can be very easily removed as a whole from the main support frame, in that it is raised through the first opening by means of a lifting truck or a forklift truck.

An advantageous further embodiment of the main support frame according to the invention makes provision that it has a first opening, arranged in which is a support frame for pre-vacuum pumps, and a second opening, formed adjacent to the first opening, arranged in which is a support frame for process-vacuum pumps, wherein the two openings are separated from one another by a first vertical carrier. As a result, the vacuum pump assemblies which differ in their function can be removed from the main support frame or inserted into it separately from one another with no problem, and are nevertheless very close to one another, such that simultaneous access to all of them is possible.

A further advantageous embodiment of the main support frame according to the invention makes provision that it comprises a base element in the region of the first opening and/or the second opening, which in turn comprises securing means for a detachable connection to the support frame for a pump stand. As a result, the support frame for the pump stands can be connected very easily and yet securely and reliably to the main support frame, and also released from it again without any problem.

A further advantageous embodiment of the main support frame according to the invention makes provision that it comprises in the region of the first opening and/or the second opening a first horizontal lower carrier, which at least over one or several part lengths exhibits a spacing interval to the ground which amounts to at least 3 cm, and ideally more than 5 cm. Accordingly, a lifting truck, after prior raising of its forks to a height which is above the upper edge of the horizontal lower carrier, is moved with its support rollers under this carrier, and its forks can be introduced into the bearing devices of the individual vacuum pumps, such that individual pumps, together with their bearing devices, and after being released from the bearing struts of the support frame, can be removed in a very simple manner from the main support frame, and can also be brought back into it.

A further advantageous embodiment of the main support frame according to the invention makes provision that the further lower horizontal carriers are likewise aligned horizontally, but do not exhibit any spacing interval to the ground, or only flat damping or height compensation elements. As a result, a simple and stable structural design of the main support frame can be achieved, since its lower carriers are in contact on the ground over almost the entire area, and it is only in the region of the opening or openings behind which the vacuum pumps are arranged in their support frame that a spacing interval is provided at the lower horizontal carrier at that point, in order that a lifting truck can remove the vacuum pumps located there from the main support frame, or introduce them into it.

A further advantageous embodiment of the main support frame according to the invention makes provision that, in the support frame or frames, all the pre-vacuum pumps and process-vacuum pumps necessary for carrying out the coating process are detachably connected to the frames. This therefore allows for all of these to be removed individually from the main support frame or individually introduced into it.

The object is also solved by a coating machine with the features of claim 10. According to this, provision is made that such a machine comprises a main support frame according to one of the embodiments referred to. Advantageously, at least one of the embodiments of the support frames referred to is also provided.

All the features of the advantageous further embodiments which are included in the subclaims belong to the invention, both individually in each case as well as in any desired combinations.

BRIEF DESCRIPTION OF THE DRAWINGS

Further details and advantages of the invention are explained in greater detail on the basis of the exemplary embodiments represented in the drawings.

The Figures show.

DETAILED DESCRIPTION OF THE INVENTION

Figure 1:
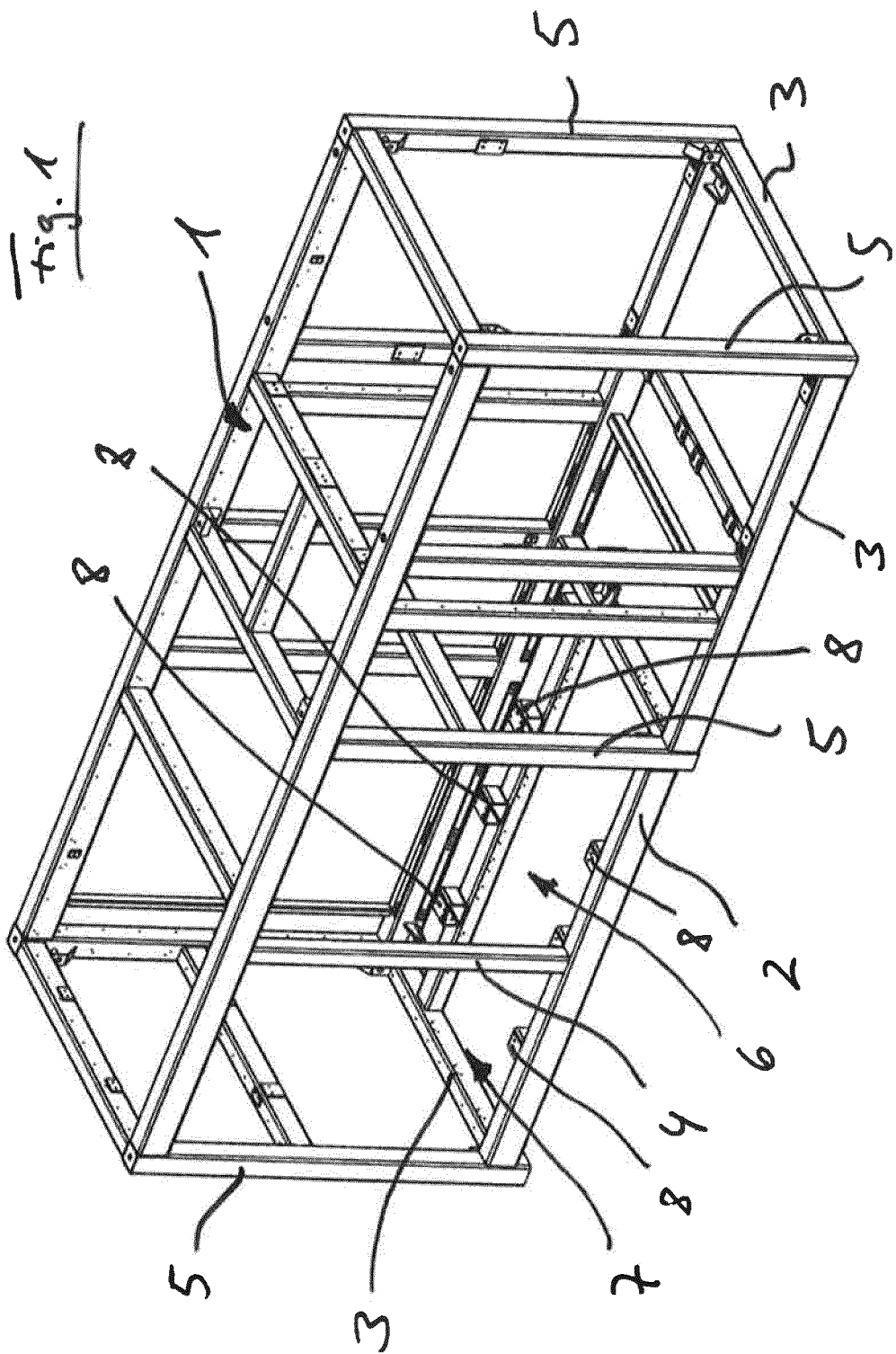
FIG. 1 A perspective view of a main support frame according to the invention, FIG. 2 a perspective view of a main support frame according to the invention, with an assemblage of all the pre-vacuum pumps set in place, FIG. 3 a perspective view of a main support frame according to the invention, with an assemblage of all the process-vacuum pumps set in place, FIG. 4 a schematic view of a further exemplary embodiment of a main support frame with two support frames introduced in place.

FIG. 1 shows a main support frame 1 according to the invention for a coating device for containers by means of a coating process. Since the present invention relates to only a part of the coating device, which is involved with the production of the vacuum necessary for the coating process, the other components of the coating device are not explained in greater details. The part of the main support frame 1 which is mainly relevant to the invention can be seen to the left in FIG. 1. Arranged in the right-hand part is a conveyor belt for the coated containers, the coating device itself, and a transfer system which moves the containers backwards and forwards in relation to the conveyor belt. These elements, since they are not relative in relation to the invention, are not represented. The same also applies to the further exemplary embodiment of a main support frame according to the invention, in accordance with FIG. 4.

The main support frame 1 is configured as essentially cuboid, and for this purpose comprises two horizontal carriers 2, 3, and vertical carriers 4, 5, of which the outer elements span the cuboid, apart from the exception explained hereinafter. In its left-hand part, facing the observer, however, a lower first horizontal carrier 2 is not arranged in the same plane as the other horizontal lower carriers 3, which lie on the ground. This first horizontal carrier 2 is located at a distance of seven cm above the ground. This allows for the rollers of a lifting truck, together with the extensions to which they are secured, to be pushed under this first horizontal carrier 2, and therefore the forks of the lifting truck to engage into the interior space of the main support frame 1.

The left-hand part, facing towards the observer, comprises a first vertical carrier 4, which in this region exhibits an opening 6 to its right, which is delimited on the right by a further vertical carrier 5, and a second opening 7 to its left, which is delimited to the left by a further vertical carrier 5, one of the four corner carriers, the carriers being thereby separated from one another. More details regarding the function of these two openings 6, 7, and their dimensions are provided in the description in relation to FIG. 4.

Figure 2:
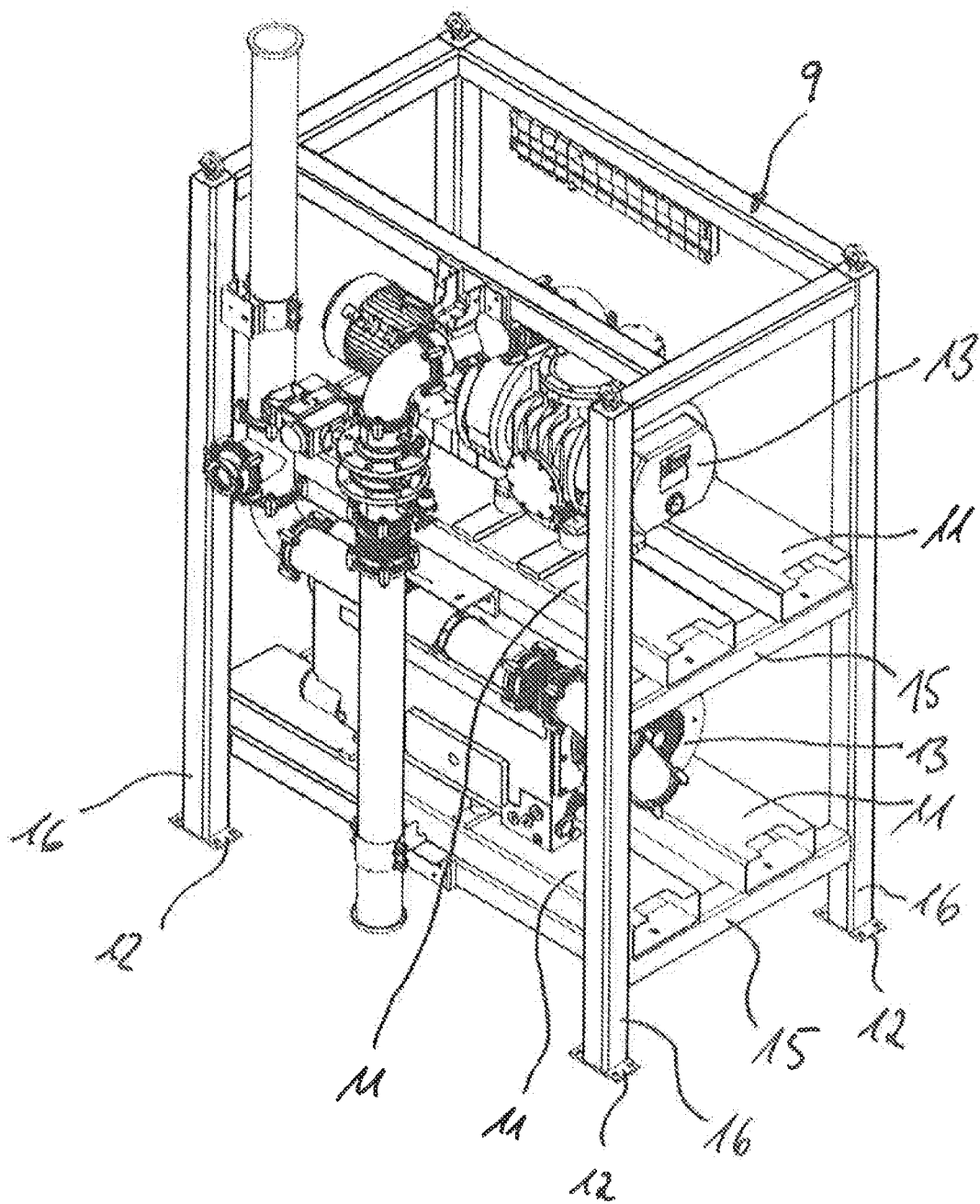
Figure 3:
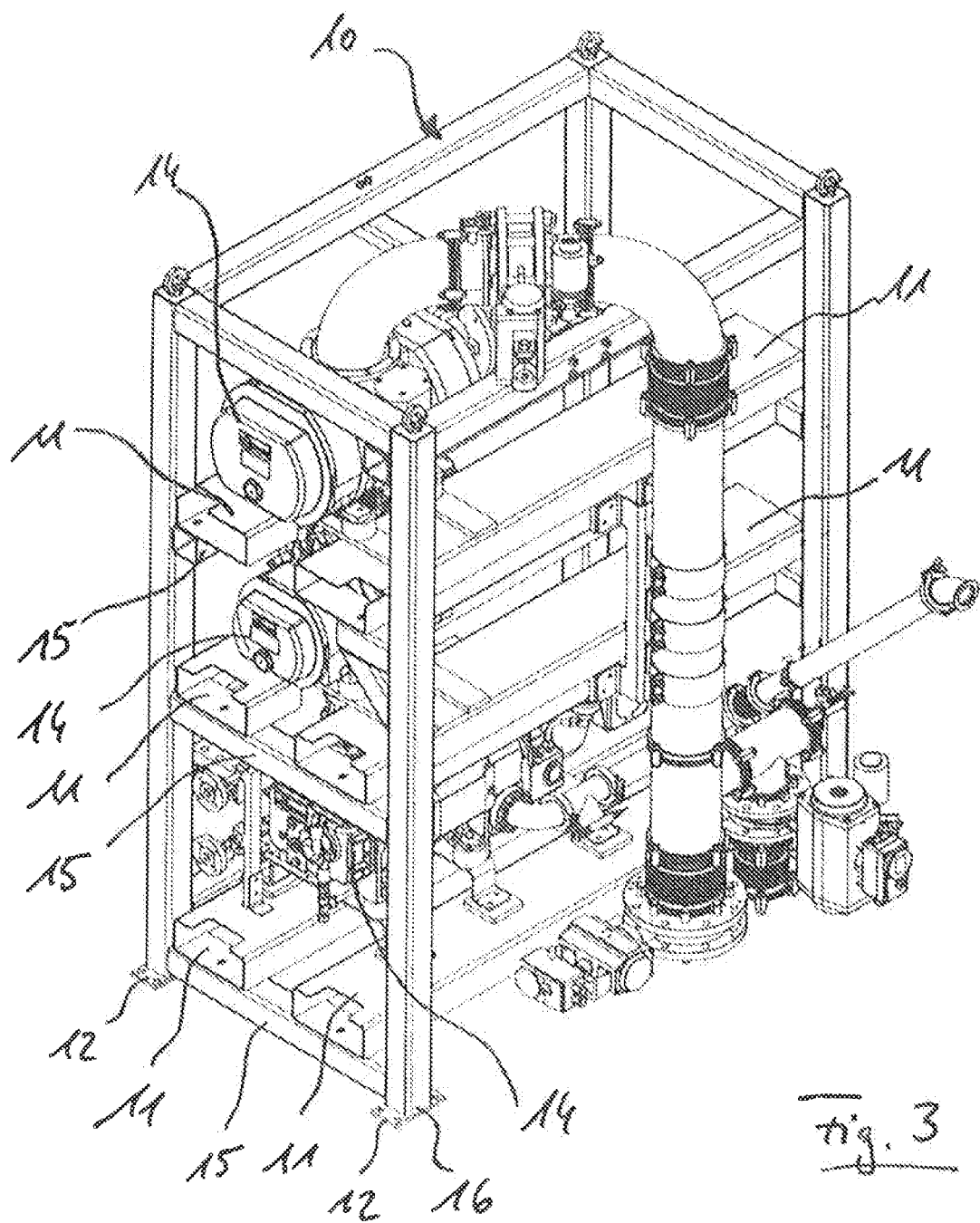

In the region behind the two openings 6, 7, in the lower region, is a row of securing means 8, which serve to connect a carrier frame 9, 10, represented in FIGS. 2 and 3, in a detachable but secure manner to the main support frame 1. Not represented is a base element, which is connected to the securing means 8 and extends horizontally.

Represented in FIG. 2 is a carrier frame 9, which carries two vacuum pumps 13. Additional elements are present at the vacuum pumps 13, such as pipes, but these are not of significance to the invention and are therefore not explained in greater detail.

Each of the two vacuum pumps 13 is arranged on two bearing devices 11, which in turn are secured by means of bearing struts 15, which can be aligned in both a longitudinal as well as a transverse direction, to the carrier frame 9. The bearing devices 11 are detachably connected to the bearing struts 15. They are hollow and open towards the front, wherein their cross-section is rectangular, and with regard to size is held within such limits that the forks of a lifting truck or the forks of a forklift truck can be moved into them without any problem. In order for this to function, the two bearing devices 11, assigned in each case to a pre-vacuum pump 13, are arranged at such a spacing interval from one another which corresponds to the lifting truck forks or forklift forks referred to heretofore.

Beneath the lower bearing strut 15, in each case, a foot 16 extends downwards, in each case at the corners. Formed at the lower end of each foot 16 is a securing device 12, by means of which the support frame 9 can be detachably connected to the securing means 8 in the ground region of the main carrier frame 1 (see in this connection FIG. 1).

The detachable methods of securing which can be used, such as, for example, screw connections, between vacuum pumps 13 and bearing devices 11, as well as between securing devices 12 and securing means 8, are well known to the person skilled in the art, and are therefore not described in greater detail. Further details regarding the dimensions follow in the description relating to FIG. 4.

Represented in FIG. 3 is a support frame 10, which supports three process-vacuum pumps 14. Additional elements are present at the process-vacuum pumps, such as pipes, but these are not of significance to the invention and are therefore not explained in greater detail.

In principle, the connection of the process-vacuum pumps 14 to the support frame 10 takes place in the same way as described in FIG. 2: They are detachably mounted on bearing devices 11, which in turn are detachably connected to bearing struts 15 which are formed at the support frame 10.

The detachable connection of the support frame 10 for the process-vacuum pumps 14 to the main support frame 1 is carried out in the same way as that of the support frame 9 for the pre-vacuum pumps 13 to the main support frame 1: Formed at the lower end of the feet 16, which extend underneath the lowest bearing strut 15, are securing devices 12, which can be connected to the main support frame 1 with securing means. The difference lies in the fact that the feet in FIG. 4 are extremely short; this can be to such an extent that the securing devices 12 are arranged directly beneath the lowest bearing strut 15, and therefore represent the foot 16 itself.

The detachable methods of securing which can be used, such as, for example, screw connections, between process-vacuum pumps 14 and bearing devices 11, as well as between securing devices 12 and securing means 8, are well known to the person skilled in the art, and are therefore not described in greater detail. Further details regarding the dimensions follow in the description relating to FIG. 4.

Represented in very schematic form in FIG. 4 is a further exemplary embodiment of a main support frame 1 according to the invention, which exhibits only one first opening 6; in differentiation to FIG. 1, in this case the first vertical carrier 4 is missing. Represented in very schematic form, in the space behind the first opening 6 the support frames 9, 10, according to FIGS. 2 and 3 are connected to the main support frame 1.

As in FIG. 1, the left lower first horizontal carrier 2 is not arranged in the plane of the further lower horizontal carrier 3, i.e. lying on the ground, but at with a spacing interval from it. The spacing interval is the same size as that from FIG. 1, such that, here too, a lifting truck can be pushed beneath it, so that its forks can be inserted into the first opening 6.

In order to be able to remove one or more of the pumps 13, 14, from the main support frame, the connections between the pump(s) 13, 14 in question and the additional parts connected to them, such as the pipes, must be detached and possibly also removed. Once this has been done, the further procedure depends on which pump(s) 13, 14 should be removed.

By way of example, such a procedure is described for the middle process-vacuum pump 14: The screw connections are released between the bearing devices 11, on which this process-vacuum pump 14 is standing, and the bearing struts 15 on which these bearing devices are lying; the screw connections may also only be present at one bearing strut 15, preferably the front one. Next, a lifting truck is pushed under the first horizontal carrier 2 in such a way that its forks enter into the open bearing devices 11. Next, the process-vacuum pump 14, together with its bearing devices 11, can be lifted slightly, and the lifting trucks can be moved out again. The introduction of the forks of the lifting truck can also take place before the screw connections are released. Instead of the process-vacuum pump 14 being removed by a lifting truck, a forklift truck can also be used, if the space available allows for this. It is then possible for another process-vacuum pump 14 to be introduced into the gap which is present, or the same pump, for example after maintenance or repair; for this purpose, the steps referred to are carried out in the reverse sequence.

It is also possible for more than one of the pumps 13, 14 present to be removed at the same time. By way of example, this is explained on the basis of the removal of the entire pump stand for the pre-vacuum pumps 13. For this purpose, it is not the screw connections between the bearing devices 11 and the bearing struts 15 which are released, but those between the securing devices 12 of the support frame 9 and the securing means 8 at the main support frame 1. Now the entire support frame 9 can be moved out, in that the forks of the lifting truck or the forklift truck are moved into the openings of the bearing devices 11, and the entire pump stand is raised sufficiently far for its feet 16 to be above the upper edge of the first horizontal carrier 2, and are then drawn out.

If the entire pump stand must be lifted out, the problem with the pump stand for the process-vacuum pumps 14 is that its support frame 10 is significantly higher, since it must take up three process-vacuum pumps 14. It is therefore necessary, according to the invention, for the height of the support frame 9, 10, to be less than the height of the first/second opening 6, 7, assigned to it.

The invention therefore allows for a very simple exchange of individual pumps 13, 14, but also of entire pump stands, with very little effort.

REFERENCE NUMBER LIST

1 Main support frame
2 First horizontal carrier
3 Further horizontal carrier
4 First vertical carrier
5 Further vertical carrier
6 First opening
7 Second opening
8 Securing means
9 Support frame for pre-vacuum pumps
10 Support frame for process-vacuum pumps
11 Bearing device
12 Securing device
13 Pre-vacuum pump
14 Process-vacuum pump
15 Bearing strut
16 Foot

What is claimed is:

1. A support frame forming a pump stand for receiving vacuum pumps for a coating device for containers, the support frame comprising:
a plurality of spaced-part verticality orientated frame members having at least one pair of opposing horizontally orientated bearing struts attached therebetween, each of the at least one pair of bearing struts being positioned at a predetermined height on the plurality of vertically orientated frame members and configured to support at least two horizontally orientated and removable bearing devices, the at least two bearing devices being configured to support a removable vacuum pump, and
a plurality of feet extending downwards from a bottom portion of the plurality of vertically orientated frame members and below a lowermost of the at least one pair of bearing struts, said plurality of feet including securing devices configured for detachable connection to a main support frame of the coating device;
wherein each of the at least two removable bearing devices is tubular and has a rectangular cross-section that is dimensioned slightly larger than a cross-section of each of a respective pair of forks of a lifting truck or a forklift truck, the at least two bearing devices being spaced apart from one another on the at least one pair of bearing struts in the horizontal direction a predetermined distance sufficient to align with and selectively receive the respective pair of forks extending from the lifting truck or the forklift truck.

2. The support frame according to claim 1, wherein the at least two bearing devices comprises at least two pairs of bearing devices for receiving vacuum pumps, each pair of bearing devices being positioned at a different height of the vertically orientated support members.

3. A main support frame for the pump stand for receiving pumps of the coating device for containers of claim 1, the main support frame comprising:
a plurality of horizontal carriers and vertical carriers positioned in a vacuum region of the coating device and arranged in relation to one another in such a way that a first opening is formed in a lateral surface of the main support frame, wherein a height of the first opening is greater than the height of the pump stand.

4. The main support frame according to claim 3, wherein the horizontal carriers and the vertical carriers are further arranged to form a second opening that is positioned adjacent to the first opening, the second opening having a height which is greater than the height of the support frame, and wherein the two openings are separated from one another by a first vertical carrier and each opening is sized to selectively receive the support frame having one or more of the removable vacuum pumps mounted thereon.

5. The main support frame according to claim 3 further comprising a base element in a region of at least one of the first opening and the second opening, the base element including securing means for forming a detachable connection to the support frame of the pump stand.

6. The main support frame according to claim 3, wherein the plurality of horizontal carriers includes a first lower horizontal carrier in a region of at least one of the first opening and the second opening, wherein at least a partial length of the first lower horizontal carrier has a vertical spacing interval from the ground which is at least 3 cm.

7. The main support frame according to claim 6, wherein the plurality of horizontal carriers further includes one or more a second lower horizontal carriers that are arranged without any spacing interval from the ground.

8. The main support frame according to claim 7, wherein the one or more a second lower horizontal carriers comprise one or more flat damping or height compensation elements positioned on an underside of the second lower horizontal carriers facing towards the ground.

9. The main support frame according to claim 3, wherein the vacuum pumps include at least one of pre-vacuum pumps and process-vacuum pumps which are detachably connected to the removable bearing devices of the support frame.

10. A coating device for containers comprising the main support frame in accordance with claim 3.

11. The main support frame according to claim 3, wherein the plurality of horizontal carriers includes a first lower horizontal carrier in a region of at least one of the first opening and the second opening, wherein at least a partial length of the first lower horizontal carrier has a vertical spacing interval from the ground which is at least 5 cm.

12. A coating device for containers comprising the support frame according to claim 1, the coating device further including a main support frame having a plurality of horizontal carriers and vertical carriers positioned in a vacuum region of the coating device, the plurality of horizontal carriers and vertical carriers being arranged in relation to one another such that at least one opening is formed in a lateral surface of the main support frame, wherein a height of the at least one opening is greater than the height of the pump stand.

* * * * *